United States Patent [19]
Zagorski

[11] Patent Number: 5,243,660
[45] Date of Patent: Sep. 7, 1993

[54] DIRECTIONAL MICROPHONE SYSTEM

[76] Inventor: Michael A. Zagorski, 82 Topsail Road, St. John's, Newfoundland, Canada, A1E 2A8

[21] Appl. No.: 893,096

[22] Filed: May 28, 1992

[51] Int. Cl.$^5$ .............................................. H04R 3/00
[52] U.S. Cl. ........................................ 381/92; 381/27; 381/94
[58] Field of Search ................ 381/92, 94, 155, 26, 381/27, 28; 364/574, 575; 379/206

[56] References Cited
U.S. PATENT DOCUMENTS

| | | | |
|---|---|---|---|
| 4,622,689 | 11/1986 | Hobrough | 381/27 |
| 4,685,136 | 8/1987 | Latshaw | 381/27 |
| 4,703,506 | 10/1987 | Sakamoto et al. | 381/92 |
| 4,712,244 | 12/1987 | Zwicker et al. | 381/68.1 |

FOREIGN PATENT DOCUMENTS 0082197  4/1988  Japan ................................. 381/92

Primary Examiner—Jin F. Ng
Assistant Examiner—Huyen D. Le
Attorney, Agent, or Firm—Fitch, Even, Tabin & Flannery

[57] ABSTRACT

A directional microphone system gain adjusts the sum of signals that are received from two microphones mounted less than an inch apart. The gain adjustment is generally proportional to the product of the two microphone signals. Analog multipliers are used both for multiplying the signals together and also to form a gate that gain adjusts the sum of the signals.

1 Claim, 3 Drawing Sheets

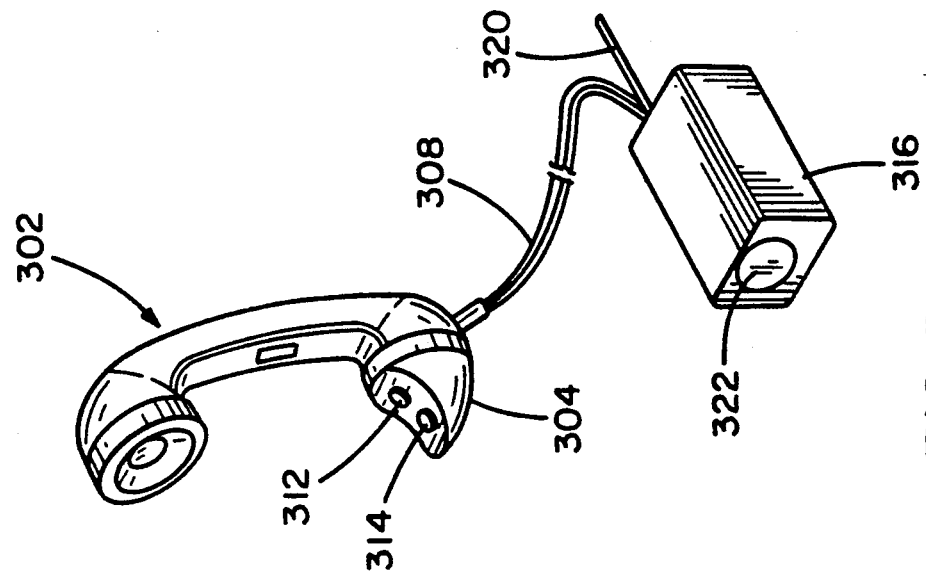
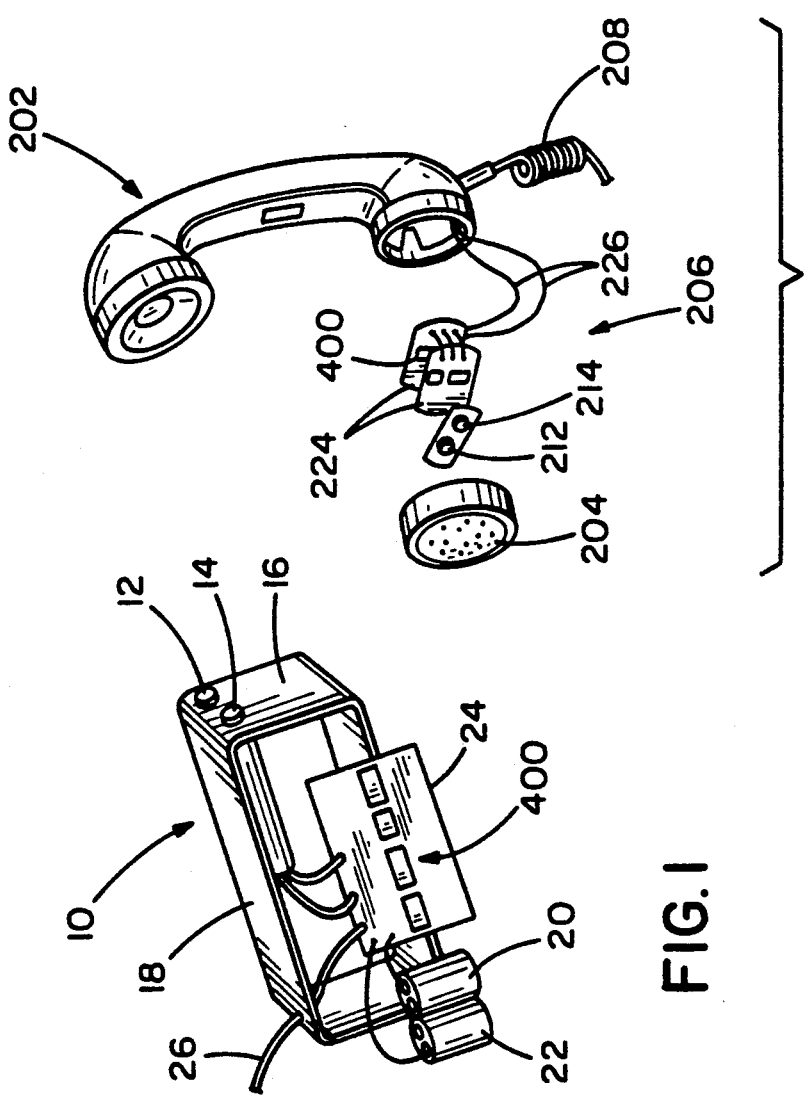
FIG. 3
FIG. 2
FIG. 1

DIRECTIONAL MICROPHONE SYSTEM

BACKGROUND OF THE INVENTION

1. Field of the Invention

This invention relates to directional microphones, and more particularly to highly directional microphone systems designed for use in situations where the background noise level is high.

2. Description of Related Art

Arrangements are known which utilize two or more microphones and then electrically sum their outputs to achieve a directional microphone system. See, for example, U.S. Pat. No. 4,712,244 (Zwicker et al.,issued on Dec. 8, 1987). But such arrangements generally require the microphones to be spaced apart farther than is desirable in a compact microphone assembly. Additionally, such conventional systems do not provide enough separation of background signals from direct signals for use in extremely noisy environments, such as within military aircraft, adjacent to rock music speakers, and in extremely noisy industrial environments.

SUMMARY OF THE INVENTION

Accordingly, an object of the present invention is to provide a directional microphone system that permits the microphone receiving elements to be mounted very close together, yet that still achieves a degree of rejection of non-direct signals adequate to permit use of the microphone system in extremely noisy background environments.

Briefly described, the present invention can be constructed utilizing two microphones mounted less than an inch apart. The signals from the two microphones are summed, and the sum signal is passed through a gate that normally greatly attenuates the sum signal. The two signals are also multiplied together, and the amplitude of the low frequency components of the product signal are used to control the gate, causing it to decrease the degree of attenuation as the low frequency components of the product signal increase in magnitude. In the preferred embodiment, analog multipliers are utilized to construct both the multiplier and the gate. In this manner, a very high degree of directionality is achieved in a microphone assembly that can be mounted in a conventional telephone handset or helmet-mounted microphone assembly.

Further objects and advantages are apparent in the detailed description which follows. The scope of the invention is defined by the claims appended to and forming a part of this specification.

BRIEF DESCRIPTION OF THE DRAWINGS

For a better understanding of the invention, reference will be made to the drawings, wherein:

FIG. 1 is a perspective view of a microphone assembly designed in accordance with a first embodiment of the invention;

FIG. 2 is a perspective view of a telephone handset containing a dual microphone element and preamplifier designed in accordance with another embodiment of the invention;

FIG. 3 is a perspective view of a telephone handset and accompanying preamplifier assembly having a threshold adjustment control all in accordance with yet another embodiment of the invention;

DESCRIPTION OF THE PREFERRED EMBODIMENT

Figure 4:
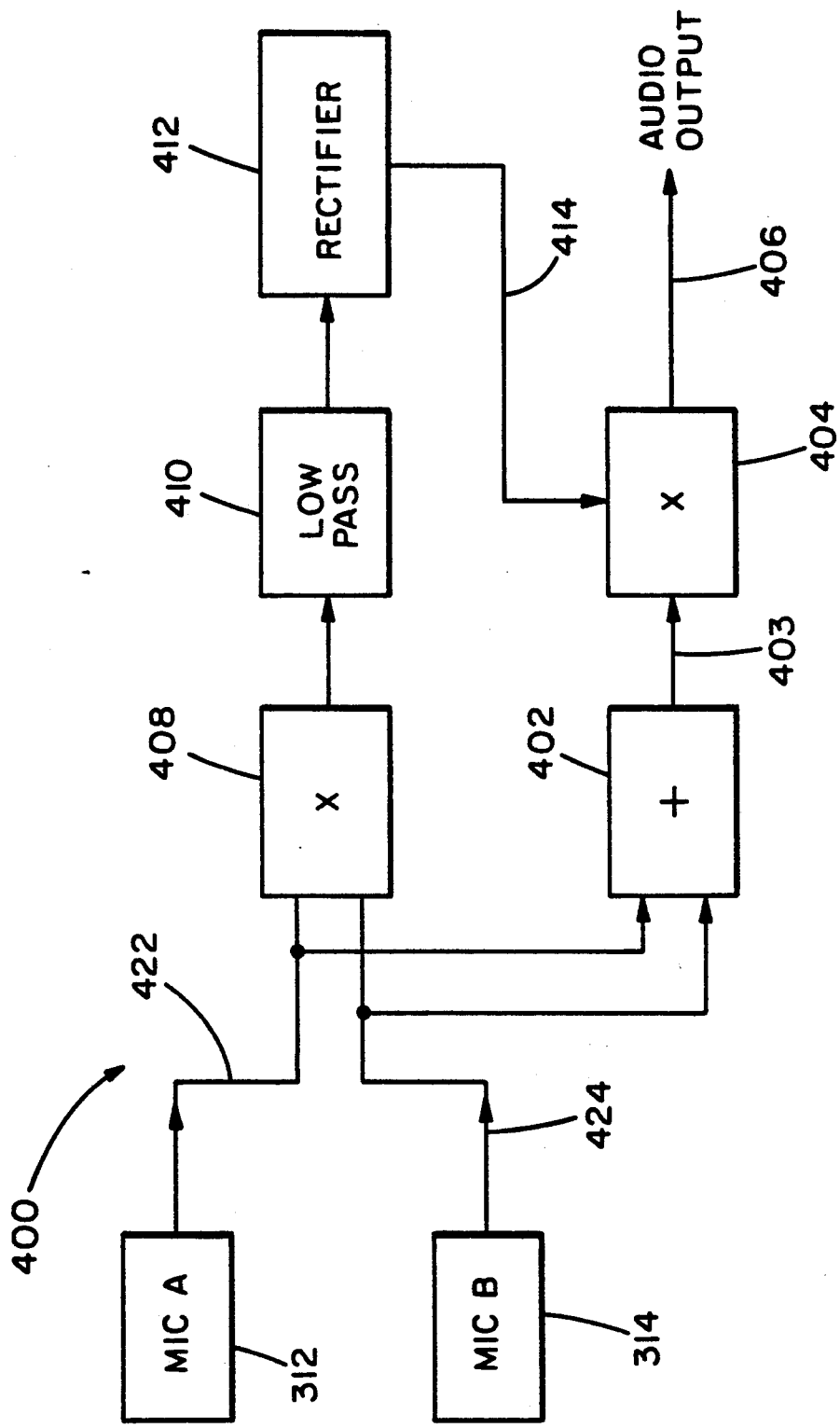
FIG. 4 is a block diagram of a preamplifier designed to implement the present invention when used with two microphone elements.

With reference to the drawings, FIG. 1 illustrates a microphone system 10 which includes two long, cylindrical microphones 12 and 14 mounted so that their sound receiving surfaces emerge from a front surface 16 of a box 18. The box 18 also contains a pair of batteries 20 and 22 and a circuit board 24. The batteries 20 and 22 and the microphones 12 and 14 are wired electrically to the circuit board 24. The circuit board 24 generates an output signal that is applied to an output cable 26. A preamplifier 400 is carried by the circuit board 24. The details of the preamplifier 400 are set forth in FIG. 4 which is described below. While the box 10 is shown open on one side with the circuit board 24 and batteries 20 and 22 outside of the box 10, it will be understood that normally the elements 20, 22, and 24 are mounted within the box 10 which is closed to form a microphone assembly.

The system 10 is used in the same manner as any microphone. It can, for example, be hand-held before the lips of a speaker (not shown) who speaks directly into the front surface 16 of the system 10. A highly directional microphone operation is thereby achieved. Even very loud background noises coming from directions other than directly into the two microphones 12 and 14 perpendicular to the front surface 16 do not appear in the output signal carried by the cable 26. But even when the speaker speaks in a normal voice directly perpendicular to the front sureface 16, a voice signal is captured, separated from the background signals, and applied to the cable 26.

FIG. 2 illustrates another embodiment of the invention mounted as the microphone element of a telephone handset 202, shown here with the cover 204 of its microphone housing removed to reveal the microphone element 206. Two miniature microphones 212 and 214 are electrically connected to a two-element circuit board 224 which contains the preamplifier 400 that processes signals received from the two microphones 212 and 214 and generates an output signal which appears on the microphone output leads 226. The preamplifier 400 derives its power from the normal D.C. current that flows through a telephone line or from extra wires (not shown) that are included in the coiled cable 208.

FIG. 3 illustrates another telephone handset 302 having a cover 304 for the microphone portion that is shaped to bring two miniature microphones 312 and 314 even closer to the mouth of the one who is speaking (not shown). The preamplifier 400 (not shown in FIG. 3) is contained within a box 316 that is connected to the handset 302 by a microphone and earpiece cable 308 and that has extending from it an output cable 320 containing output signals from the preamplifier 400. Mounted upon the box 316 is a sensitivity control 322 that permits the sensitivity of the microphone system to background noise to be adjusted as needed.

FIG. 4 is a block diagram of the preamplifier 400, illustrating its major components as implemented in the embodiment of the invention shown in FIG. 3. A summing circuit 402 sums incoming signals 422 and 424 received from the microphones 312 and 314 and supplies a sum signal 403 through a gain control gating circuit 404 to an audio output 406. A multiplier circuit 408 multiplies together the incoming signals 422 and 424 received from the microphones 312 and 314 and passes the resulting product signal through a low pass filter 410 and a rectifier 412 which produces a gain control signal 414 that controls the gain of the gating circuit 404.

Low-level incoming sound signals reach the audio output 406 greatly attenuated, since the gain of such signals is proportional to the square of their amplitude as determined by the multiplier 408. As a signal weakens, its amplitude is attenuated in proportion to the square of the the signal level. As the amplitude of a signal falls, the gain of the circuit falls much faster, and accordingly a relatively small drop in signal level at the microphones produces a much larger drop in the amplitude of the signal in the audio output 406.

Signals coming from other than directly perpendicular to the two microphones 312 and 314 are attenuated first by the summer 402, since they may not be in phase, and secondly by the gain circuit 404 which is controlled by the multiplier 408, since the product of signals not in phase falls off rapidly with increase in angle away from perpendicular. To emphasize this rejection of signals coming in from an angle, the low-pass filter 410 in conjunction with the rectifier 412 causes the multiplier 408 to function as a cross correlation mechanism which effectively rejects all incoming signals that are not precisely in phase.

When used together, as shown, there is synergy among all of the mechanisms just described that greatly accentuates the ability of this microphone system to reject and attenuate background signals while readily passing voice signals directed directly into the microphone elements. In actual tests, attenuation of background noises of over 60 decibels have been achieved relative to voice signals spoken directly into the microphones 312 and 314.

Figure 5:
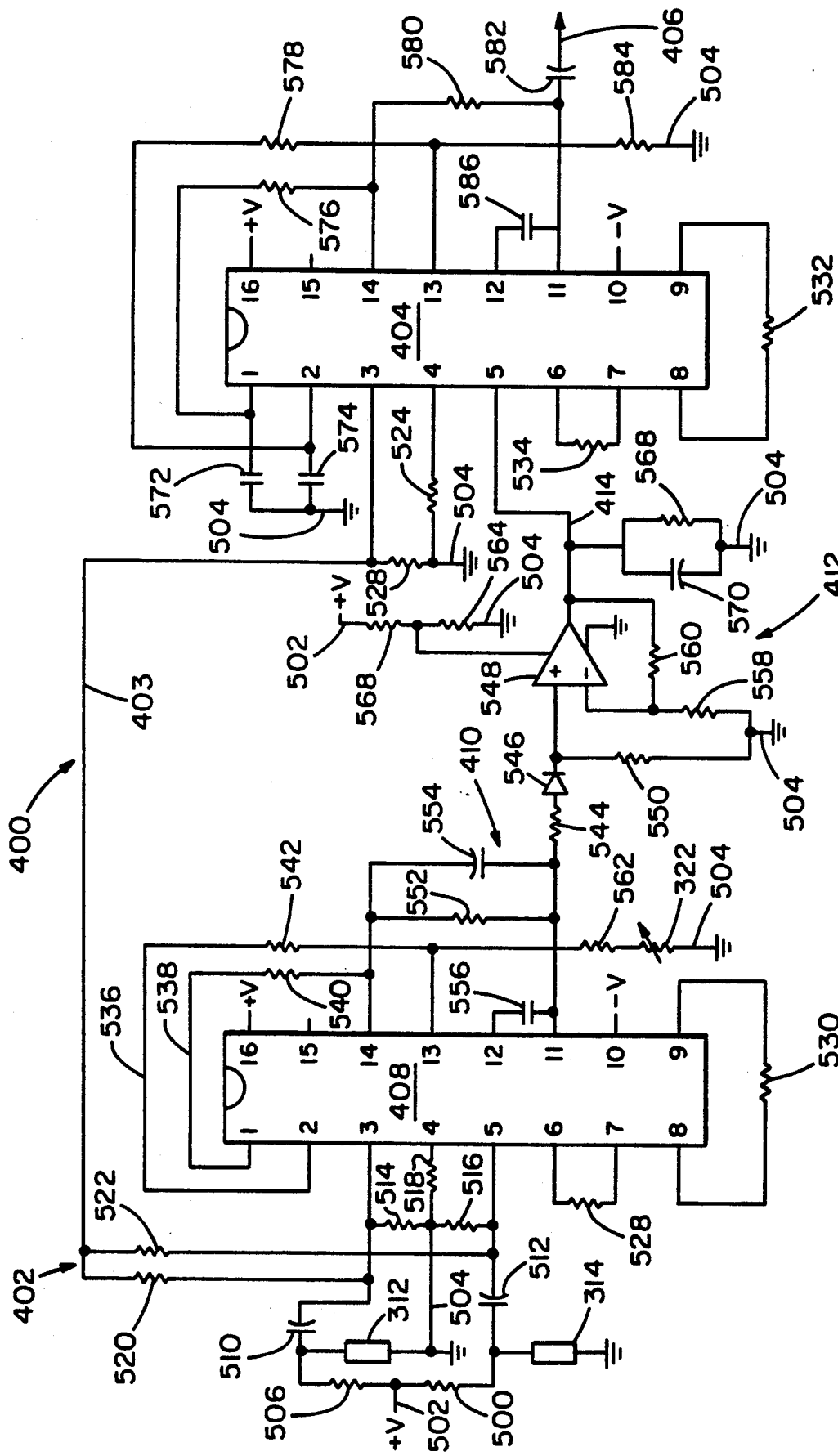
FIG. 5 is a detailed schematic diagram of the preamplifier shown in FIG. 4 and intended for use in conjunction with the telephone handset shown in FIG. 3.

FIG. 5 illustrates the preferred embodiment of the preamplifier 400 in full detail and as just explained.

The microphones 312 and 314 are provided with operating power from a positive source of supply 502 by 2.2K resistors 506 and 508. 1.5 mfd capacitors 510 and 512 connect the microphones 312 and 314 to X and Y input terminals (pins 3 and 5) of the multiplier circuit 408 which is an EXAR model XR2208 operational multiplier. 2.2K resistors 514 and 516 connect these input terminals to ground 504, and a 1K resistor 518 connects an X and Y opposite polarity input terminal (pin 4) of the multiplier circuit 408 to ground 504.

The sum circuit 402 comprises a pair of 10K resistors 520 and 522 that couple the capacitors 510 and 512 to an X input (pin 3) of the gating circuit 404 which is also an EXAR XR-2208 Operational Multiplier. This X input is connected to ground 504 by a 2.2K resistor 526. The common X-Y opposite polarity input (pin 4) of the gain circuit 404 is connected to ground 504 by a 1K resistor 524.

The gain of the X and Y inputs of the multiplier circuit 408 is set by 1K resistors 528 and 530, connected as shown; and likewise, the gain of the gating circuit 404 multiplier X and Y inputs is adjusted by a 1K resistor 532, which adjusts the X gain applied to the sum signal 403, and by a 47K resistor 534, which adjusts the gain of the Y input which receives the gain control signal 414.

The normal and inverted output signals 536 and 538 of the multiplier circuit 408 are applied through 10K resistors 540 and 542 to the normal and inverted inputs (pins 13 and 14) of an operational amplifier contained within the multiplier circuit 408. An output signal (pin 11) flows through a 10K resistor 544 and a rectifier diode 546 to a noninverted input of an operational amplifier 548 within the rectifier circuit 412. The amplifier 548's noninverted input is also connected to ground 504 by a 100K resistor 550. To achieve the low-pass filter 410, a parallel circuit comprising a 100K resistor 552 and 0.22 ufd capacitor 554 is connected in a negative feedback manner accross the inverted input and output (pins 14 and 11) of the multiplier circuit 408's operational amplifier, as shown. An 8picofarad capacitor 556 suppresses oscillations within the multiplier circuit 408, in accordance with the manufacturer's specifications.

To permit adjustment of the input signal level threshold, the sensitivity control 322 is a 100K potentiometer and is connected from ground 504 in series with a 50K resistor 562 to the noninverted input (pin 13) of the operational amplifier within the multiplier circuit 408.

The inverted input of the operational amplifier 548 is connected to ground 504 by a 1K resistor 558 and to the amplifier 548's output by a 10K resistor 560, giving a gain of 10 to 1.

Serially-connected 470 ohm resistor 564 and 1K resistor 566 are connected from ground 504 to the positive supply 502 to provide a lower potential for the operational amplifier 548, which is a 386 quad operational amplifier.

The output of the operational amplifier 548 is connected to ground 504 by a parallel circuit comprising a 4.7K resistor 568 and a 4.7 ufd capacitor 570. The gain control signal 414 appears at this output of the amplifier 548 and is fed directly into the Y input of the gating circuit 404 which is another multiplier.

The normal and inverted outputs (pins 1 and 2) of the multiplier within the gating circuit 404 are connected to ground 504 by 0.1 ufd capacitors 572 and 574 and to the normal and inverted inputs (pins 13 and 14) of an operational amplifier within the gating circuit 404 by 10K resistors 576 and 578. The output (pin 11) of this operational amplifier within the gating circuit 404 is connected to its inverting input (pin 14) by a 100K resistor 580 and to the audio output 406 by a 1.5 ufd capacitor 582. The noninverting input (pin 13) of this operational amplifier within the gating circuit 404 is connected to ground 504 by another 100K resistor 584. A 2 picofarad capacitor 586 connects pins 11 and 12, again to suppress oscillations in accordance with the manufacturer's specifications.

While the preferred embodiment of the invention has been described in complete detail, it will be understood that numerous modifications and changes will occur to those skilled in the art. The true spirit and scope of the invention is therefore defined precisely in the claims which follow.

I claim:

1. A directional microphone system comprising:
   at least two microphones mounted adjacent one another and each generating electrical signals;
   summing means for producing a sum signal representing the sum of at least two of said microphone electrical signals;
   product means for producing a product signal representing the product of at least two of said microphone electrical signals; and
   gating means for passing said sum signal into an output signal and modifying the gain of said sum signal in accordance with the magnitude of said product signal.

* * * * *